US008029188B2

(12) United States Patent
Park

(10) Patent No.: US 8,029,188 B2
(45) Date of Patent: Oct. 4, 2011

(54) TEMPERATURE SENSOR FOR AUTOMOBILE

(76) Inventor: Hee Wan Park, Seoul (KR)

( * ) Notice: Subject to any disclaimer, the term of this patent is extended or adjusted under 35 U.S.C. 154(b) by 535 days.

(21) Appl. No.: 11/990,206

(22) PCT Filed: Aug. 30, 2006

(86) PCT No.: PCT/KR2006/003414
§ 371 (c)(1),
(2), (4) Date: Jan. 12, 2009

(87) PCT Pub. No.: WO2007/027048
PCT Pub. Date: Mar. 8, 2007

(65) Prior Publication Data
US 2009/0168839 A1    Jul. 2, 2009

(30) Foreign Application Priority Data
Sep. 2, 2005    (KR) .................. 10-2005-0081525

(51) Int. Cl.
*G01K 7/16*    (2006.01)
(52) U.S. Cl. .............. 374/141; 374/185; 338/22 R
(58) Field of Classification Search .............. 33/100, 33/141, 144, 163, 183, 185, 208
See application file for complete search history.

(56) References Cited

U.S. PATENT DOCUMENTS

| 4,276,775 | A | | 7/1981 | Provasnik | |
|---|---|---|---|---|---|
| 4,454,370 | A | * | 6/1984 | Voznick | ........................ 374/208 |
| 5,513,613 | A | | 5/1996 | Taylor | |
| 5,743,646 | A | * | 4/1998 | O'Connell et al. | ........... 374/148 |
| 6,899,457 | B2 | * | 5/2005 | Kurano | ........................ 374/185 |
| 2006/0013282 | A1 | * | 1/2006 | Hanzawa et al. | ............. 374/163 |
| 2008/0025373 | A1 | * | 1/2008 | Toyoda et al. | ............... 374/188 |
| 2008/0080592 | A1 | * | 4/2008 | Houben et al. | ............... 374/185 |
| 2008/0205484 | A1 | * | 8/2008 | Toudou et al. | ............... 374/185 |
| 2010/0290502 | A1 | * | 11/2010 | Cubizolles | .................... 374/141 |
| 2011/0122918 | A1 | * | 5/2011 | Murray | ......................... 374/208 |

FOREIGN PATENT DOCUMENTS

| DE | 199 41 188 | 3/2000 |
|---|---|---|
| FR | 2 793 020 | 11/2000 |

OTHER PUBLICATIONS

International Search Report issued Dec. 8, 2006 in the International (PCT) Application of which the present application is the U.S. National Stage.
Written Opinion of the International Searching Authority issued Dec. 8, 2006 in PCT/KR2006/003414 of which the present application is the U.S. National Stage.

* cited by examiner

*Primary Examiner* — Brad Bennett
(74) *Attorney, Agent, or Firm* — Wenderoth, Lind & Ponack, L.L.P.

(57) ABSTRACT

A temperature sensor for an automobile is disclosed. The temperature sensor includes a conductive sensor body including a bottom wall, an insulative connector housing coupled to the sensor body, first and second terminals provided inside the connector housing, which have lower contact portions, a ceramic element mounted near the bottom wall in the sensor body for detecting temperature, which has lower and upper electrode surfaces, and a connecting disc mounted on the ceramic element, which has lower and upper connecting surfaces. The lower electrode surface of the ceramic element is attached to the bottom wall by a conductive adhesive layer and grounded to the sensor body. The upper electrode surface of the ceramic element is electrically connected to the lower contact portion of the first terminal through the lower and upper connecting surfaces of the connecting disc. The lower contact portion of the second terminal contacts the sensor body.

1 Claim, 13 Drawing Sheets

TEMPERATURE SENSOR FOR AUTOMOBILE

TECHNICAL FIELD

The present invention relates to a temperature sensor, and more particularly to a temperature sensor for an automobile, which can detect a temperature of engine coolant, transmission oil or engine suction air and respond promptly to variation in temperature.

BACKGROUND ART

In general, a temperature sensor for an automobile detects a temperature of engine coolant, transmission oil or engine suction air, and transmits the detected temperature to an ECU (Electronic Control Unit). The temperature sensor uses a ceramic element for detecting a middle and low temperature range (the maximum detectable temperature: 150° C. to 170° C.).

FIG. 1 is a cross-sectional view showing a conventional temperature sensor for an automobile, and FIG. 2 is an enlarged view of circle "A" in FIG. 1. A temperature sensor for detecting a temperature of engine coolant is used as an example.

As shown in the drawings, a conventional temperature sensor for an automobile comprises a sensor body 1 and a connector housing 2. The sensor body 1 is formed in a probe type. The sensor body 1 includes a cylindrical inner empty space 4 and a bottom wall 3 for closing the bottom of the space 4. A flange 5 extends radially from the upper end of the body 1, and a connector receiving portion 6 extends upward from the periphery of the flange 5. A screw thread 7 is formed around the outer-middle surface of the body 1. The screw thread 7 may be tightened into a screw hole formed at a wall of an engine cooling jacket, for detecting the temperature of engine coolant.

The lower portion of the connector housing 2 is received in the connector receiving portion 6 of the sensor body 1. The connector housing 2 is fixed to the sensor body 1 by wrapping around the upper periphery of the connector receiving portion 6. The connector housing 2 is made from a plastic material by an injection molding process. A rod 8 extends integrally downward from the connector housing 2. Before the injection molding process, lower ends of two lead wires 10a and 10b are soldered to a ceramic element 9, and upper ends of two lead wires 10a and 10b are connected to two terminals 11a and 11b disposed at the connector housing 2. The ceramic element 9 is inserted within an epoxy or glass molding 12. During the injection molding process, the ceramic element 9 is disposed near the lower end of the rod 8 extending from the connector housing 2, and the lead wires 10a and 10b pass through the rod 8 to be connected to the terminals 11a and 11b.

The rod 8 of the connector housing 2 is inserted into the empty space 4 of the sensor body 1. When the connector housing 2 is received in the connector receiving portion 6 of the sensor body 1, an O-ring 13 is interposed between the lower outer surface of the connector housing 2 and the inner surface of the connector receiving portion 6. Thus, the ceramic element 9 is located near the bottom wall 3 inside the empty space 4 of the sensor body 1.

When the above conventional temperature sensor is used for detecting a variation in temperature of engine-coolant, the ceramic element 9 located near the bottom wall 3 of the sensor body 1 detects the temperature of engine coolant. The heat of engine coolant is transferred to the ceramic element 9 through the bottom wall 3, the rod 8 and the molding 12. It is preferable that the ceramic element 9 has a good response to the variation in temperature. The ceramic element 9 typically has a size of 1.0×1.0×0.5 mm.

In addition, the temperature sensor disclosed in Korean Patent No. 254860 and Korean Utility Model Registration No. 248772, which have been assigned to this Applicant, may be referred as a prior art.

Those skilled in the art have attempted to improve the response of the temperature sensor. For example, a plurality of concave and convex portions may be formed at the outer surface of the sensor body to increase a heat exchange area. Also, an inorganic matter may be mixed with the epoxy or glass molding, within which the ceramic element is inserted, to improve a heat transfer efficiency of the molding. Further, a plurality of concave and convex portions may be formed at the outer surface of the molding to increase a heat exchange area. Also, the ceramic element may be formed compactly to easily react to the increase in temperature. In addition, to reduce a heat loss from the lead wires connecting the ceramic element to the terminals, a relatively thin lead wire may be used or a material having low heat-loss characteristics may be selected for manufacturing the lead wire.

However, if forming the ceramic element compactly, it has a good response to the increase in temperature, but it has a poor response to the decrease in temperature because the heat exchange area is too small to efficiently emit the heat generated at the ceramic element when current is applied through the ceramic element.

DISCLOSURE

Technical Problem

Therefore, the present invention has been made in view of the above problems, and it is an object of the present invention to provide a temperature sensor for an automobile, which can respond promptly to variation in temperature of engine coolant, transmission oil or engine suction air.

It is another object of the present invention to provide a temperature sensor for an automobile, which can have an improved response to both increase and decrease in temperature.

It is yet another object of the present invention to provide a temperature sensor for an automobile, which can be easily designed to be used for various purposes and increase productivity and quality by standardizing a basic constitution of a sensor body and a ceramic element for detecting a temperature.

Technical Solution

In accordance with an aspect of the present invention, the above and other objects can be accomplished by the provision of a temperature sensor for an automobile comprising: a conductive sensor body including a bottom wall and a small-diameter portion formed near the bottom wall, the sensor body having a probe shape; an insulative connector housing coupled to the sensor body; first and second terminals provided inside the connector housing, the first and second terminals having lower contact portions; a ceramic element mounted near the bottom wall in the sensor body for detecting temperature, the ceramic element having an upper electrode surface and a lower electrode surface; and a connecting disc mounted on the ceramic element, the connecting disc having an upper connecting surface and a lower connecting surface. The lower electrode surface of the ceramic element is attached to the bottom wall by a conductive adhesive layer and grounded to the sensor body. The upper electrode surface of the ceramic element is electrically connected to the lower contact portion of the first terminal through the lower and upper connecting surfaces of the connecting disc. The lower contact portion of the second terminal contacts the sensor body.

Advantageous Effects

According to a temperature sensor for an automobile in accordance with the present invention, the temperature sensor can respond promptly to variation in temperature of engine coolant, transmission oil or engine suction air. Further, the temperature sensor has an improved response to both increase and decrease in temperature.

Also, the temperature sensor can be easily designed to be used for various purposes and increase productivity and quality by standardizing a basic constitution of a sensor body and a ceramic element for detecting a temperature.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings.

First Embodiment

Figure 3:
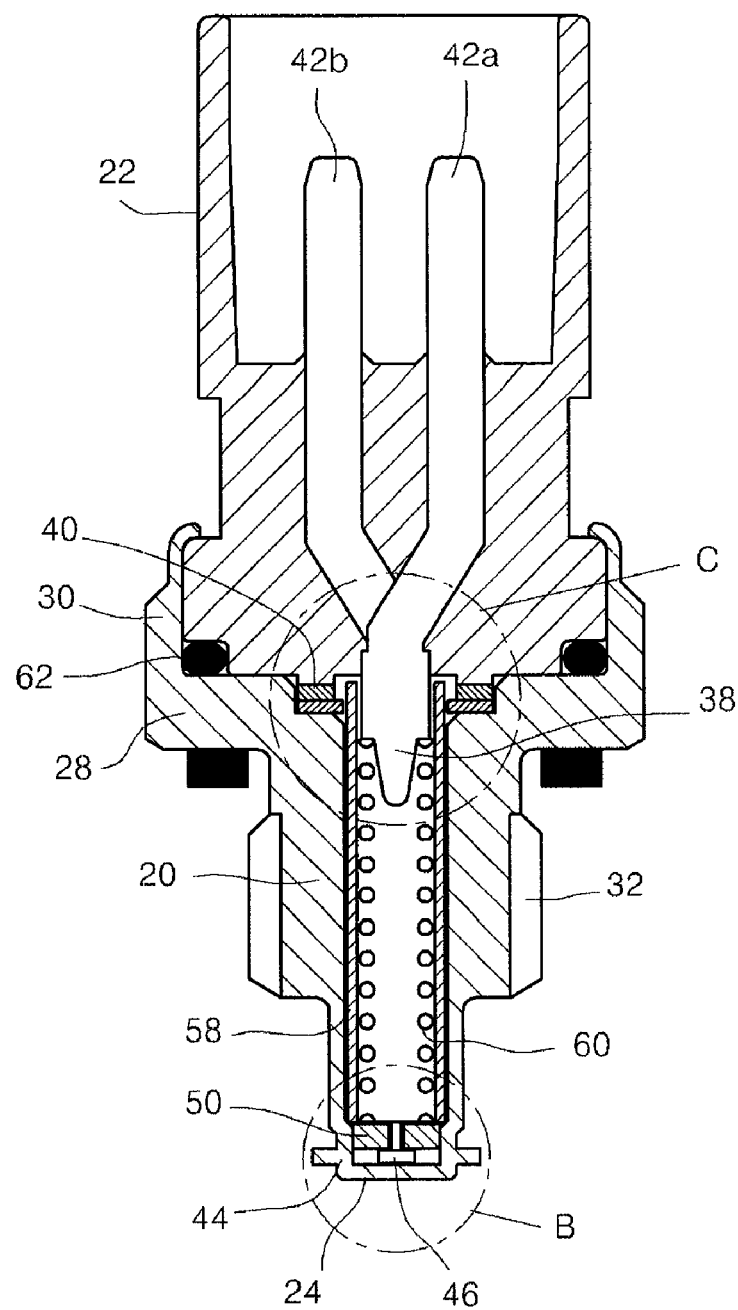
FIG. 3 is a cross-sectional view showing a temperature sensor for an automobile in accordance with a first preferred embodiment of the present invention.
Figure 4:
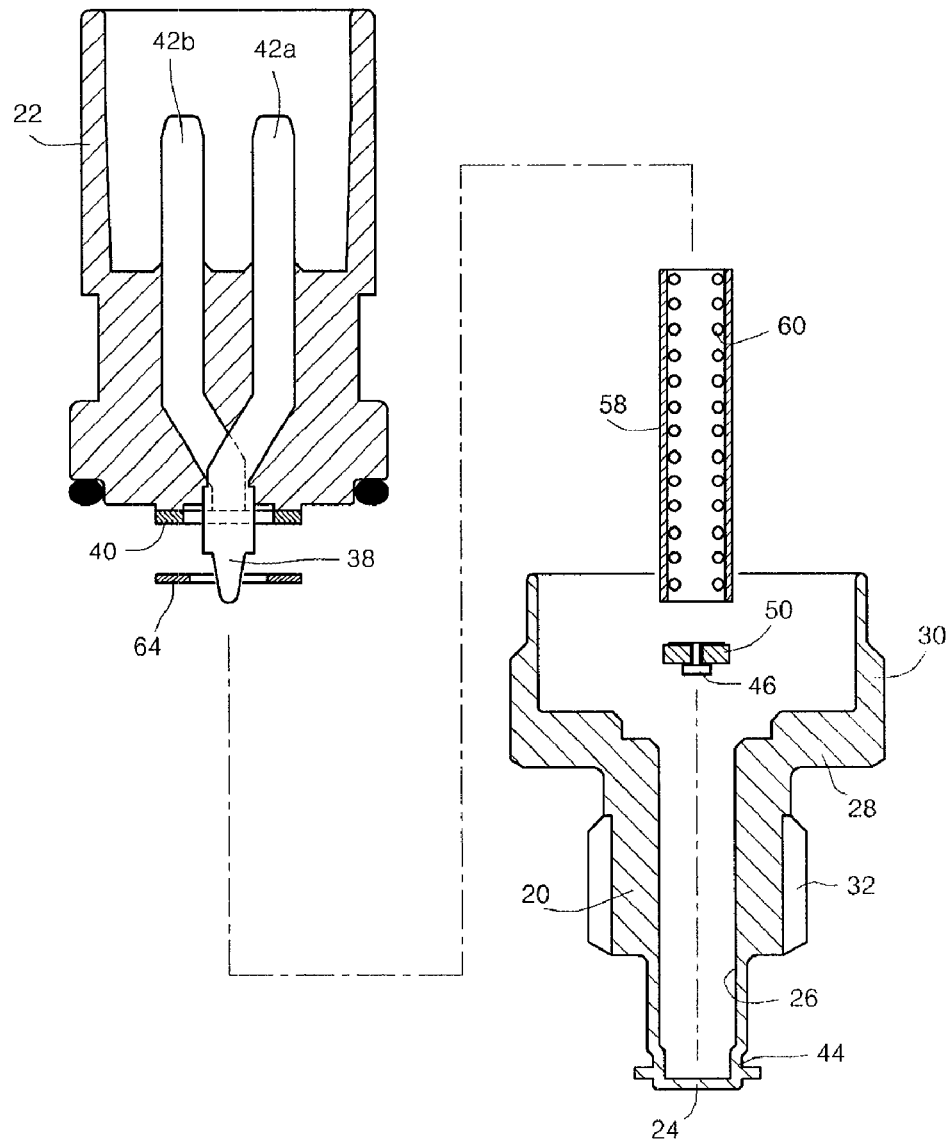
FIG. 4 is an exploded cross-sectional view showing a temperature sensor for an automobile depicted in FIG. 3.
Figure 5:
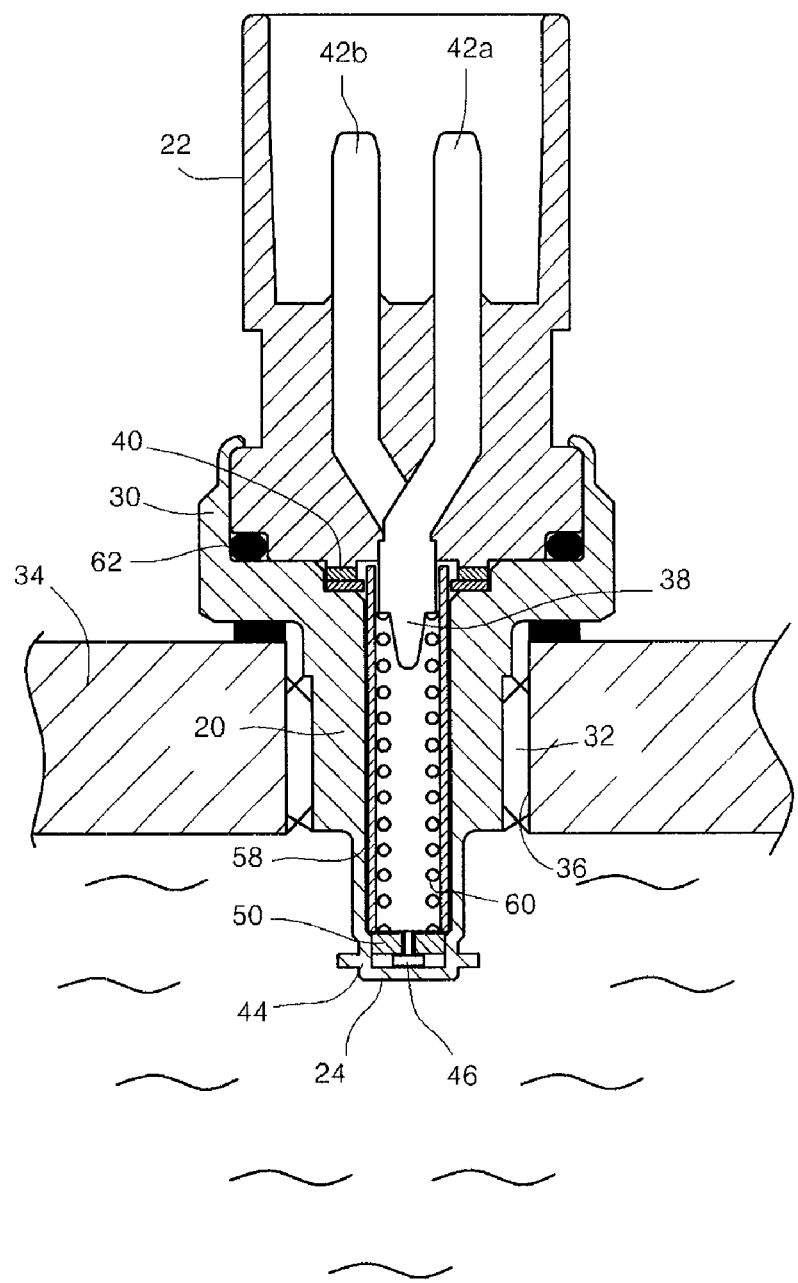
FIG. 5 is a cross-sectional view showing an operating state of a temperature sensor for an automobile depicted in FIG. 3.

FIGS. 3 and 4 are cross-sectional views showing a structure of a temperature sensor for an automobile in accordance with a first preferred embodiment of the present invention, and FIG. 5 is a cross-sectional view showing an operating state of a temperature sensor for an automobile depicted in FIG. 3.

As shown in the drawings, a temperature sensor according to the present invention comprises a conductive metallic sensor body 20 which is formed in a probe type, and a connector housing 22 which is made from an insulating material like synthetic resins. The sensor body 20 includes a cylindrical inner empty space 26 and a bottom wall 24 for closing the bottom of the inner empty space 26. A flange 28 extends radially from the upper end of the sensor body 20, and a connector receiving portion 30 extends upward from the periphery of the flange 28. A screw thread 32 is formed around the outer-middle surface of the sensor body 20. The screw thread 32 may be tightened into a screw hole 36 formed at a wall 34 of an engine cooling jacket, for detecting the variation in temperature of engine coolant (see FIG. 5).

A pair of terminals 42a and 42b are mounted inside the connector housing 22. Lower contact portions 38 and 40 of the respective terminals 42a and 42b are exposed from the bottom surface of the connector housing 22. The terminals 42a and 42b are connected to an ECU (not shown) mounted to an automobile. For example, the terminal 42a is a positive terminal, and its lower contact portion 38 has an arrowhead shape and extends downward from the connector housing 22. And, the other terminal 42b is a negative terminal, and its lower contact portion 40 has a ring shape to surround the lower contact portion 38 of the positive terminal 42a, and is in close contact with the bottom surface of the connector housing 22.

The sensor body 20 is formed with a small-diameter portion 44 near the bottom wall 24.

A ceramic element 46, which is a temperature detecting element, is inserted into the small-diameter portion 44 of the sensor body 20 through the inner empty space 26. The ceramic element 46 is formed in a disc shape, which has an upper electrode surface and a lower electrode surface. The lower electrode surface of the ceramic element 46 faces the bottom wall 24 of the sensor body 20, and is adhered to the bottom wall 24 by a conductive adhesive layer 48.

Figure 6:
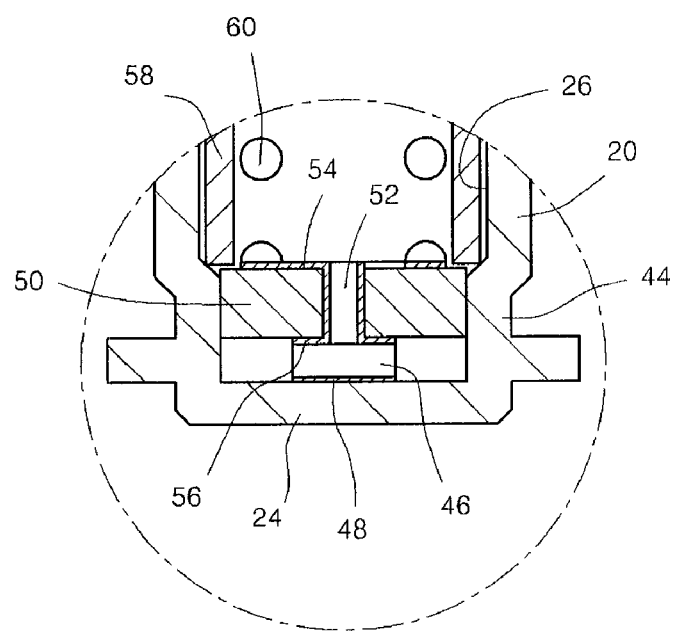
FIG. 6 is an enlarged view of circle "B" in FIG. 3.
Figure 7:
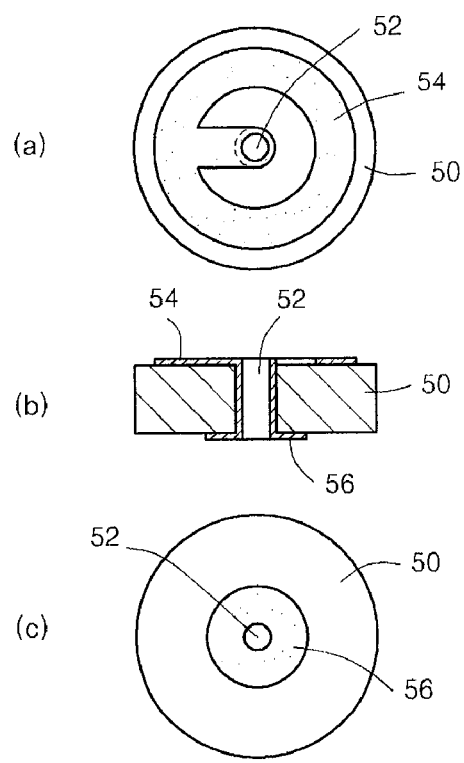
FIG. 7 is a view showing a connecting disc for an electrical connection of a temperature detecting ceramic element of a temperature sensor depicted in FIG. 3, (a) is a plan view, (b) is a cross-sectional view and (c) is a bottom view.

Before the lower electrode surface is adhered to the bottom wall 24, the upper electrode surface of the ceramic element 46 is soldered to a connecting disc 50 by using a cream solder or adhered to the connecting disc 50 by using a conductive adhesive agent. As shown in FIGS. 6 and 7, the connecting disc 50 is made from an insulating material, and is shaped in a printed circuit board having a central through-hole 52. The connecting disc 50 is formed with an upper connecting surface 54 and a lower connecting surface 56 which are electrically connected to each other through the through-hole 52. The upper electrode surface of the ceramic element 46 is attached to the lower connecting surface 56 of the connecting disc 50.

Since the connecting disc 50 is fitted in the small-diameter portion 44 of the sensor body 20 and the ceramic element 46 is attached to the bottom wall 24, the lower electrode surface of the ceramic element 46 is electrically connected to the sensor body 20.

Then, an insulating tube 58 is inserted into the inner empty space 26 of the sensor body 20. An outer diameter of the insulating tube 58 is slightly smaller than a diameter of the inner empty space 26. A conductive metallic spring 60 is inserted into the insulating tube 58, and is disposed on the upper connecting surface 54 of the connecting disc 50. Preferably, the spring 60 is a coil spring. A lower end of the insulating tube 58 is positioned on the small-diameter portion 44, and an upper end is positioned at the bottom surface of the connector receiving portion 30. The spring 60 is in a compressed state, and a lower end of the spring 60 electrically contacts the upper connecting surface 54 of the connecting disc 50 and an upper end electrically contacts the lower contact portion 38 of the positive terminal 42*a*.

When inserting the connector housing 22 into the connector receiving portion 30, an O-ring 62 is interposed between the lower outer surface of the connector housing 22 and the inner surface of the connector receiving portion 30. The connector housing 22 is fixed to the sensor body 20 by wrapping around the upper periphery of the connector receiving portion 30.

The arrowhead-shaped lower contact portion 38 of the positive terminal 42*a* is inserted into the upper portion of the spring 60 and contacts the upper end of the spring 60 to compress the same. So, the positive terminal 42*a* is electrically connected to the upper electrode surface of the ceramic element 46 through the spring 60 and the connecting disc 50. The ring-shaped lower contact portion 40 of the negative terminal 42*b* contacts an inner surface of the connector receiving portion 30. So, the negative terminal 42*b* is electrically connected to the sensor body 20. It is preferable to provide a conductive metallic wave washer 64 for securely contacting the lower contact portion 40 of the negative terminal 42*b* to the sensor body 20.

As shown in FIG. 5, the temperature sensor constructed as above is mounted to the engine cooling jacket in such a manner that the screw thread 32 is tightened into the screw hole 36 formed at the wall 34 of the engine cooling jacket, for detecting the variation in temperature of engine coolant.

As described above, the temperature sensor of the present invention has characteristics that the lower electrode surface of the ceramic element 46 is directly attached to the bottom wall 24 of the sensor body 20. Accordingly, the electric circuit of the temperature sensor is constituted by the positive terminal 42*a*, the spring 60, the upper connecting surface 54 of the connecting disc 50, the lower connecting surface 56 of the connecting disc 50, the ceramic element 46, the sensor body 20 (the bottom wall 24), and the negative terminal 42*b*.

Like this, by directly adhering the lower electrode surface (a grounding portion) of the ceramic element 46 to the bottom wall 24 of the sensor body 20, a lead wire for connecting the ceramic element 46 to the negative terminal 42*b* is unnecessary. If considering that the temperature sensor of the prior art has a problem of breakage of a lead wire, the temperature sensor of the present invention has an advantage of having a more stable and reliable structure by eliminating the conventional lead wire. Further, the ceramic element 46 can respond promptly to the variation in temperature of engine coolant, transmission oil or engine suction air, especially to both increase and decrease in temperature.

Figure 9:
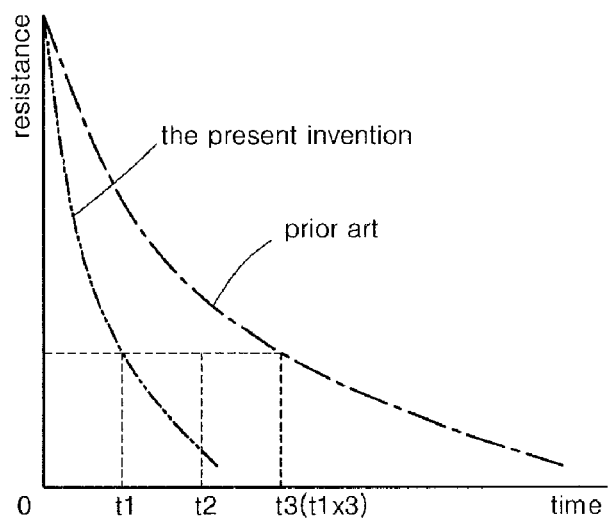
FIG. 9 is a graph showing response curves of temperature sensors of the present invention and the prior art when abruptly raising the temperature of coolant in an engine cooling jacket from 20° C. to 80° C.

FIG. 9 is a graph showing response curves of the temperature sensors of the present invention and the prior art when abruptly raising the temperature of coolant in the engine cooling jacket from 20° C. to 80° C. As shown in the drawing, a resistance of the temperature sensor of the present invention is changed about three times faster than that of the prior art. Therefore, it can be clearly seen that the response of the temperature sensor of the present invention to increase in temperature is considerably improved in comparison with that of the prior art.

Figure 10:
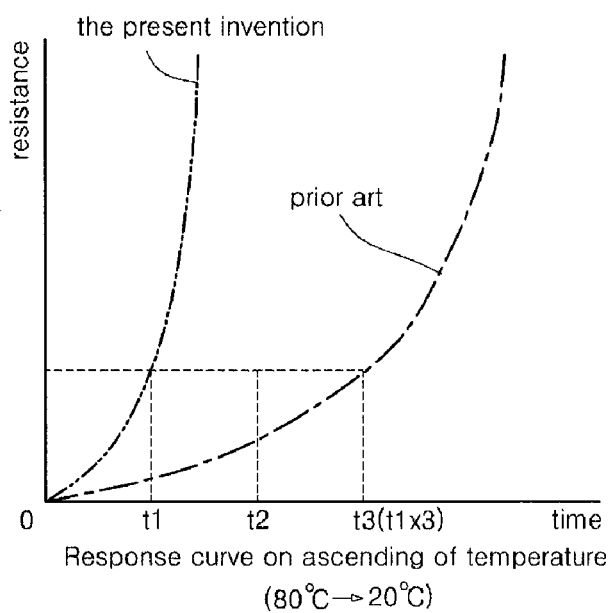
FIG. 10 is a graph showing response curves of temperature sensors of the present invention and the prior art when abruptly lowering the temperature of coolant in an engine cooling jacket from 80° C. to 20° C.

FIG. 10 is a graph showing response curves of the temperature sensors of the present invention and the prior art when abruptly lowering the temperature of coolant in the engine cooling jacket from 80° C. to 20° C. It can be also clearly seen that the response of the temperature sensor of the present invention to decrease in temperature is considerably improved.

Such a temperature sensor of the present invention can be easily designed to be used for various purposes and increase productivity and quality by standardizing the basic constitution of the sensor body and the ceramic element.

Second Embodiment

Figure 8:
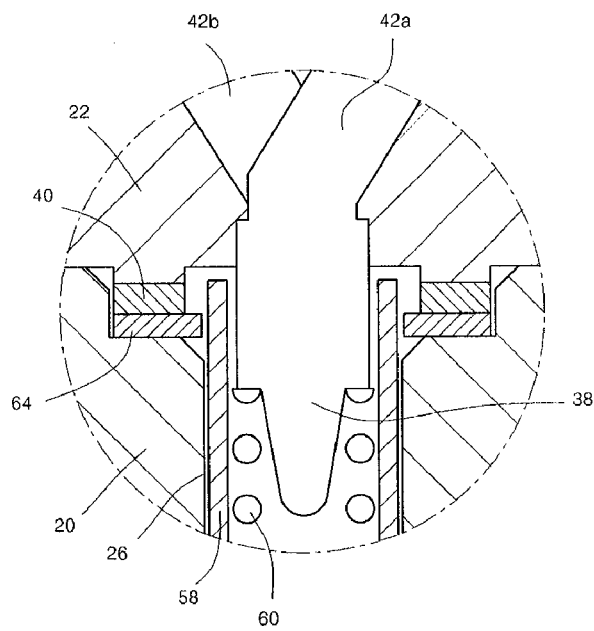
FIG. 8 is an enlarged view of circle "C" in FIG. 3.
Figure 11:
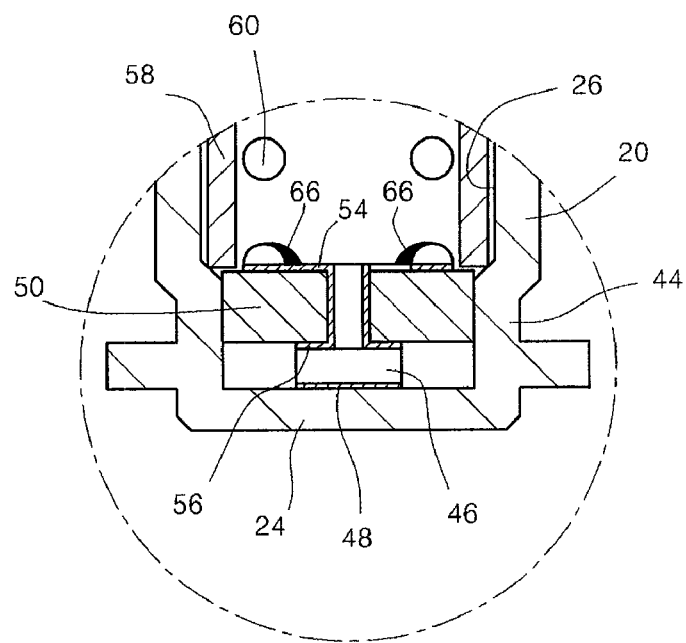
FIG. 11 is an enlarged cross-sectional view similar to FIG. 6, which shows a temperature sensor in accordance with a second preferred embodiment of the present invention.
Figure 12:
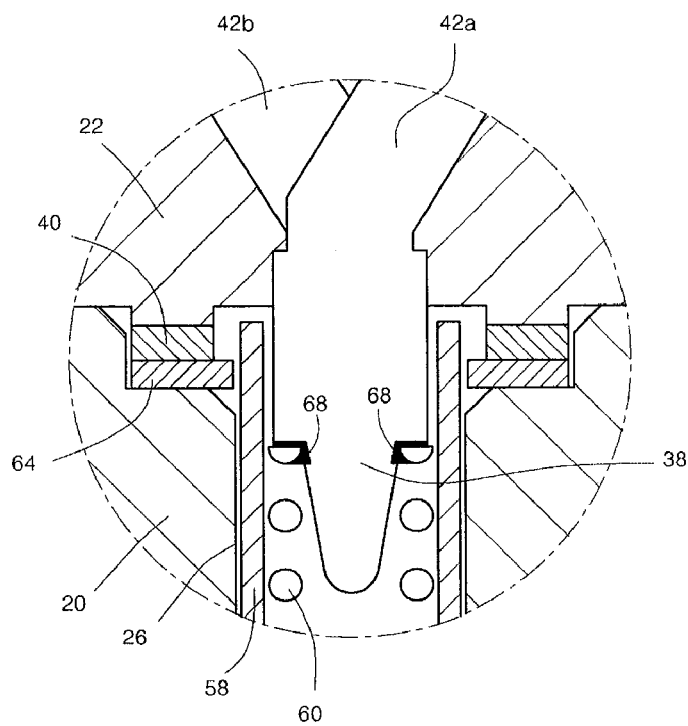
FIG. 12 is an enlarged cross-sectional view similar to FIG. 8, which shows a temperature sensor in accordance with a second preferred embodiment of the present invention.

FIGS. 11 and 12 are enlarged cross-sectional views similar to FIGS. 6 and 8, respectively, which show a temperature sensor in accordance with a second preferred embodiment of the present invention.

A temperature sensor according to a second embodiment of the present invention has a structure of securely electrically-connecting the connecting disc 50 to the positive terminal 42*a*. As shown in FIGS. 11 and 12, a lower end of the spring 60 is fixed to the upper connecting surface 54 of the connecting disc 50 by a solder 66, and an upper end of the spring 60 is fixed to the lower contact portion 38 of the positive terminal 42*a* by a solder 68. The coupling structure of other elements of this embodiment is same as that of the aforesaid first embodiment. Such a temperature sensor of this embodiment can operate more stably.

Third Embodiment

Figure 13:
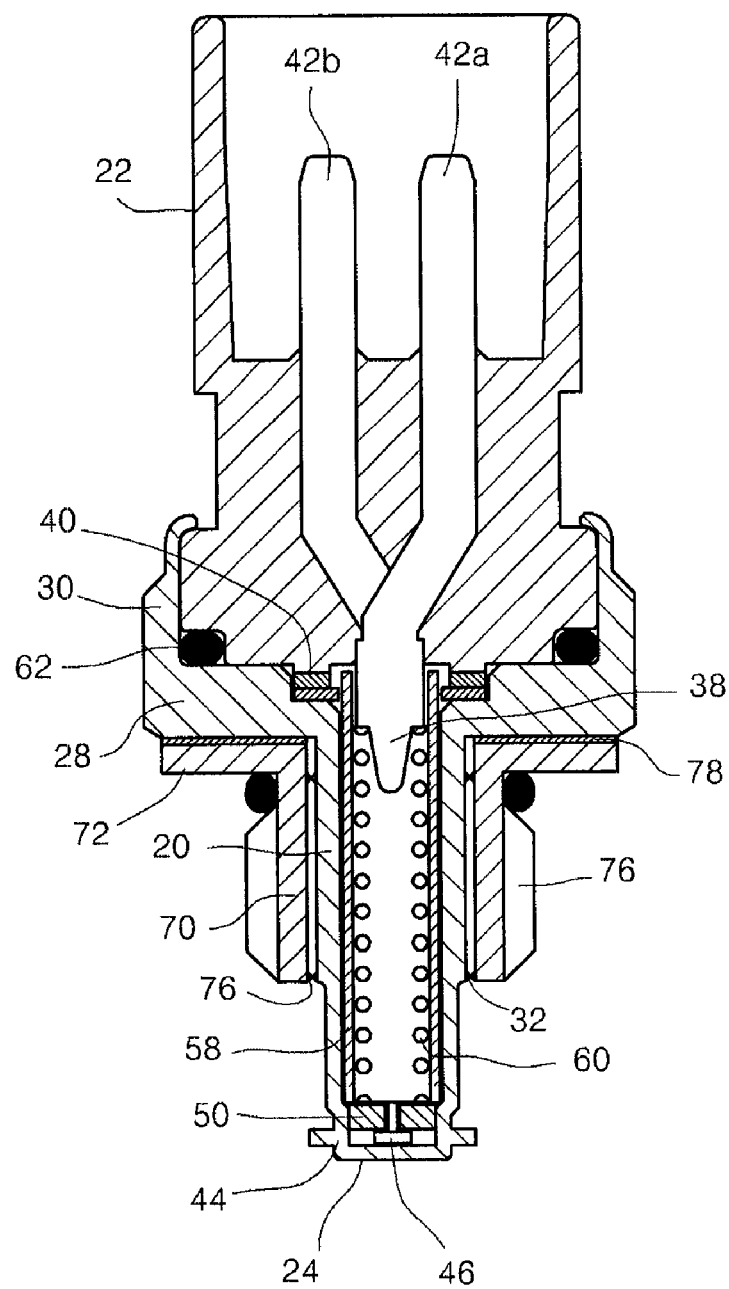
FIG. 13 is a cross-sectional view showing a temperature sensor for an automobile in accordance with a third embodiment of the present invention.
Figure 14:
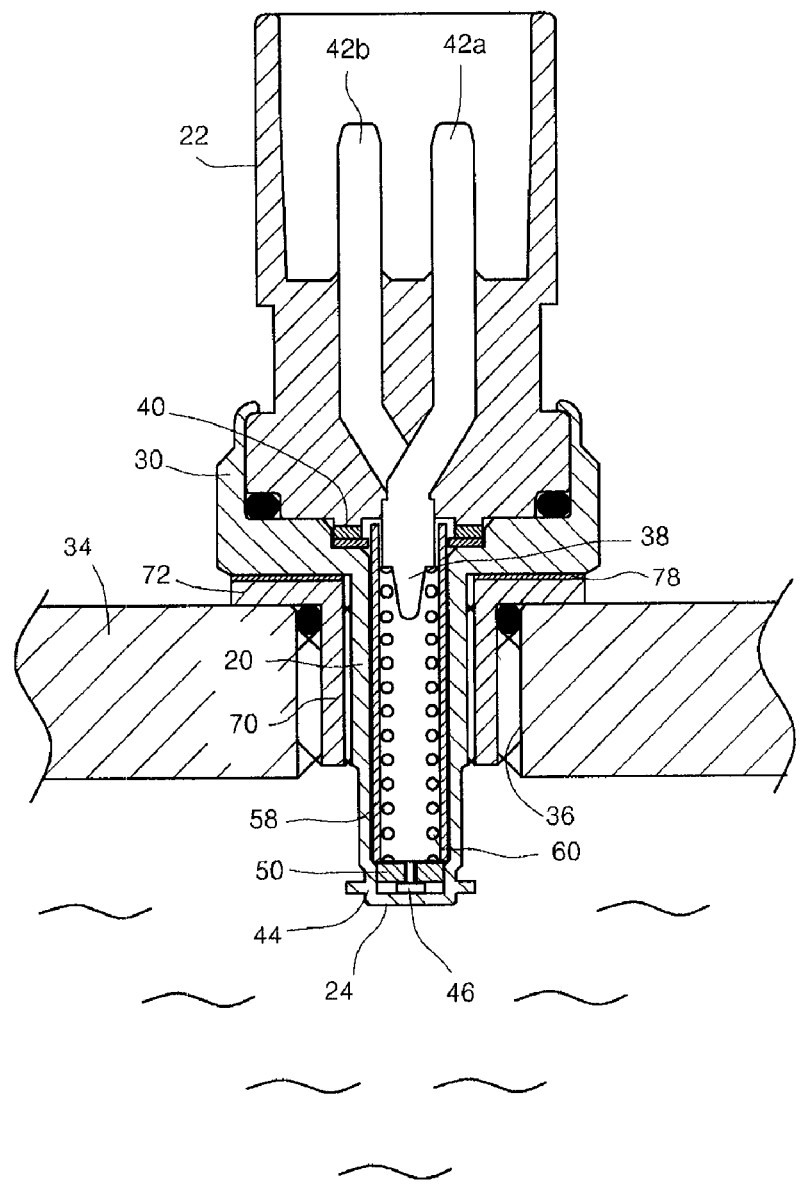
FIG. 14 is a cross-sectional view showing an operating state of a temperature sensor for an automobile depicted in FIG. 13.

FIG. 13 is a cross-sectional view showing a structure of a temperature sensor for an automobile in accordance with a third preferred embodiment of the present invention, and FIG. 14 is a cross-sectional view showing an operating state of a temperature sensor for an automobile depicted in FIG. 13.

The temperature sensor of the first and second embodiments is configured such that the lower electrode surface of the ceramic element 46 is grounded on the sensor body 20 and connected to the ECU through the sensor body 20 and the negative terminal 42*b*, and the sensor body 20 is connected to a grounding portion of an electrical device of an automobile through the wall 34 of the engine cooling jacket. Typically, an operating voltage of the ECU is 5V, and an operating voltage of the electrical device is 12V. Thus, electric noise may be generated at the temperature sensor of the first and second embodiments.

In view of the above problem of the previous embodiments, a temperature sensor of a third embodiment is made for interrupting the electrical connection between the sensor body 20 and the wall 34 of the engine cooling jacket.

As shown in FIGS. 13 and 14, the temperature sensor of this embodiment comprises an insulating cover 70 encircling the sensor body 20. The insulating cover 70 is formed in a hollow cylindrical shape and made from a synthetic resin. The insulating cover 70 is formed with a flange 72 which extends radially from its upper periphery. An inner screw thread 74 is formed along an inner surface of the insulating cover 70 to be screw-coupled to the screw thread 32 of the sensor body 20. An outer screw thread 76 is formed along an outer surface of the insulating cover 70 to be tightened into the screw hole 36 formed at the wall 34 of the engine cooling jacket. In consideration of a thickness of the insulating cover 70, it is preferable to make the sensor body 20 to have a smaller diameter than the previous embodiments.

When mounting the insulating cover 70 to the sensor body 20, a gasket 78 is interposed between the flange 72 of the insulating cover 70 and the flange 28 of the sensor body 20. Such an insulating cover 70 interrupts the electrical connection between the sensor body 20 and the wall 34 of the engine cooling jacket.

Modified Embodiment

Figure 15:
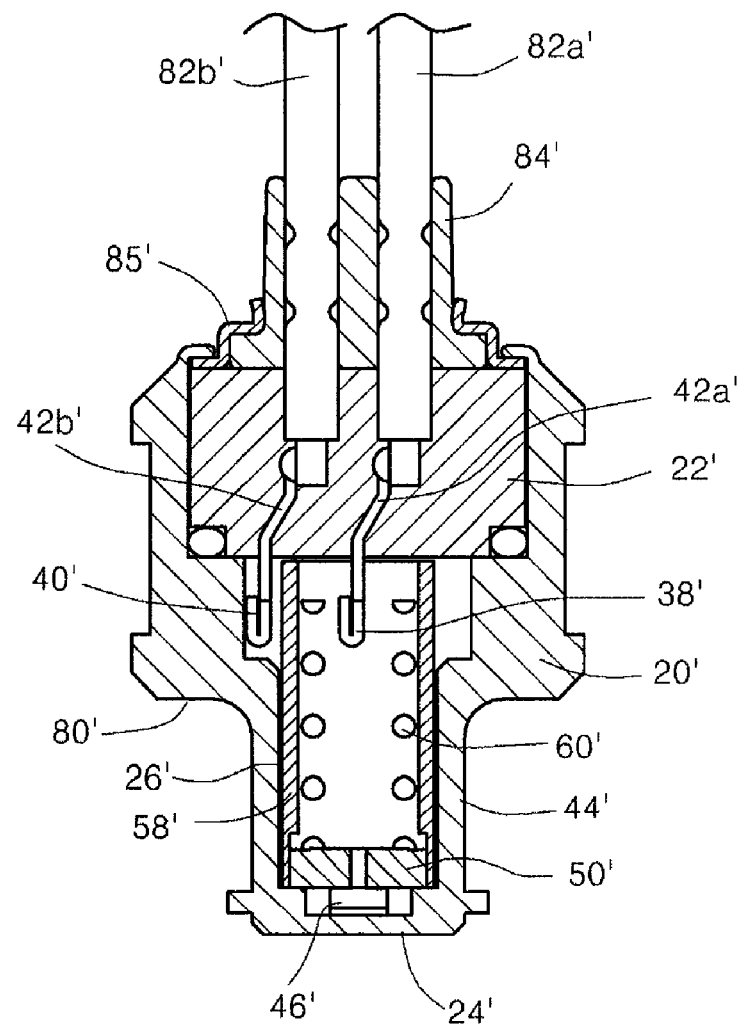
FIG. 15 is a cross-sectional view showing a temperature sensor for an automobile for detecting a temperature of transmission oil in accordance with a modified embodiment of the present invention.
Figure 16:
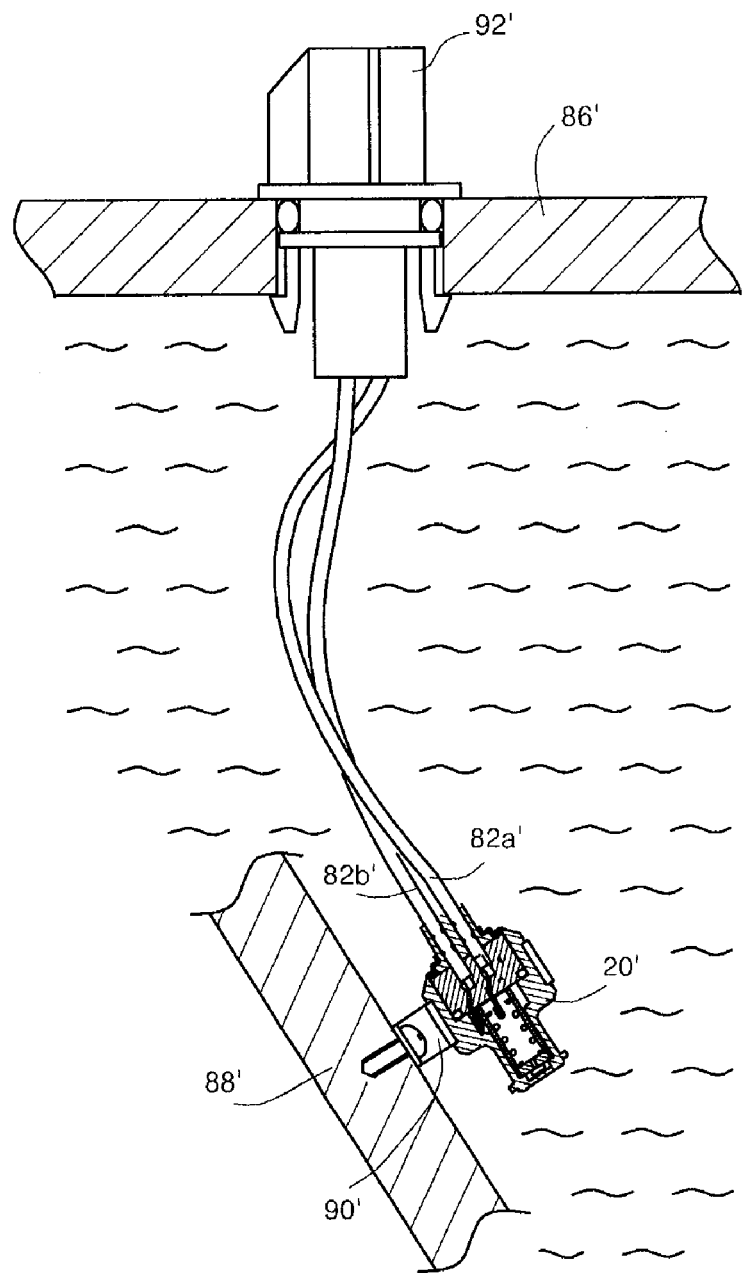
FIG. 16 is a cross-sectional view showing an operating state of a temperature sensor for an automobile depicted in FIG. 15.
Figure 1:
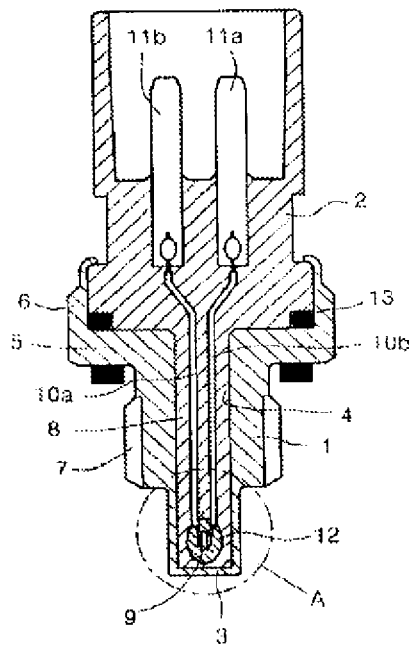
Figure 2:
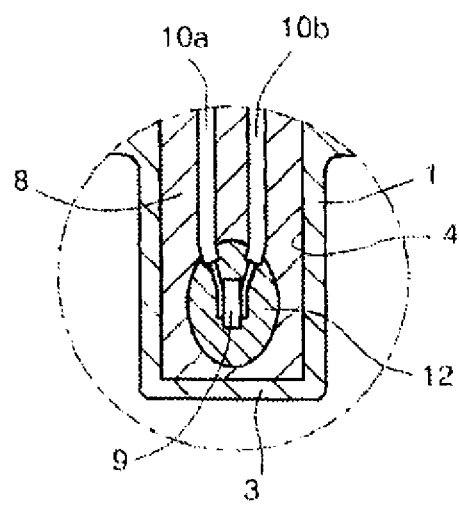

FIG. 15 is a cross-sectional view showing a temperature sensor for an automobile for detecting a temperature of transmission oil in accordance with a modified embodiment of the present invention, and FIG. 16 is a cross-sectional view showing an operating state of a temperature sensor for an automobile depicted in FIG. 15.

As shown in the drawings, a temperature sensor according to a modified embodiment comprises a cylindrical sensor body 20', an upper end of which is opened and a lower end of which is closed by a bottom wall 24'. The sensor body 20' is formed with a small-diameter portion 44' near the bottom wall 24'. A stepped portion 80' is formed between the small-diameter portion 44' and sensor body 20'.

Inside the small-diameter portion 44' are provided a ceramic element 46' and a connecting disc 50'. An upper electrode surface of the ceramic element 46' is adhered to a lower surface of the connecting disc 50'. A lower electrode surface of the ceramic element 46' is attached to an inner surface of the bottom wall 24' by using a conductive adhesive agent.

A terminal holder 22' is inserted into the sensor body 20' through the opened upper end of the sensor body 20'. The terminal holder 22' is made from a synthetic resin material. A pair of terminals 42a' and 42b' are inserted into the terminal holder 22'. One terminal 42a', e.g., a positive terminal, has a lower contact portion 38' which is formed in an arrowhead shape and located in the sensor body 20'. The other terminal 42b', e.g., a negative terminal, has a lower contact portion 40' which is formed in a hook shape and located in the sensor body 20'. The terminals 42a' and 42b' are connected to an ECU (not shown) mounted to the automobile through lead wires 82a' and 82b'.

An insulating tube 58' is inserted into an inner empty space 26' of the sensor body 20', and a coil spring 60' is inserted into the insulating tube 58'. The lower contact portion 38' of the positive terminal 42a' is electrically connected to the upper electrode surface of the ceramic element 46' through the spring 60' and the connecting disc 50'. The lower contact portion 40' of the negative terminal 42b' contacts an inner surface of the sensor body 20'.

Parts of the lead wires 82a' and 82b' extending upward from the terminal holder 22' are sealed by a rubber packing 84', and fixed to the sensor body 20' by a packing holder 85'.

Such a temperature sensor is mounted to one part 88' of a transmission housing 86' to be immersed in transmission oil within the transmission housing 86'. A clamp 90' of a synthetic resin material is coupled to the part 88' of the transmission housing 86' for insulatively fixing the sensor body 20'. The lead wires 82a' and 82b' extend to a connecting member 92' coupled to the transmission housing 86' and are connected to the ECU through the connecting member 92'.

The temperature sensor according to the modified embodiment belongs to the category of the present invention in view of that the ceramic element 46' is directly attached to the bottom wall 24' of the sensor body 20'.

INDUSTRIAL APPLICABILITY

As apparent from the above description, since the temperature sensor for an automobile in accordance with the present invention is configured such that the lower electrode surface of the ceramic element for temperature detection is directly attached to the bottom wall of the conductive sensor body and the upper electrode surface of the ceramic element is electrically connected to the terminal through the connecting disc without using a lead wire, the temperature sensor can respond promptly to variation in temperature of engine coolant, transmission oil or engine suction air. Further, the temperature sensor has an improved response to both increase and decrease in temperature.

The temperature sensor can be easily designed to be used for various purposes and increase productivity and quality by standardizing a basic constitution of the sensor body and the ceramic element.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A temperature sensor for an automobile comprising:
a conductive sensor body including a bottom wall and a small-diameter portion formed near the bottom wall, the sensor body having a probe shape;
an insulative connector housing coupled to the sensor body;
first and second terminals provided inside the connector housing, the first and second terminals having lower contact portions;
a ceramic element mounted near the bottom wall in the sensor body for detecting temperature, the ceramic element having an upper electrode surface and a lower electrode surface; and
a connecting disc mounted on the ceramic element, the connecting disc having an upper connecting surface and a lower connecting surface,
wherein the lower electrode surface of the ceramic element is attached to the bottom wall by a conductive adhesive layer and grounded to the sensor body,
the upper electrode surface of the ceramic element is electrically connected to the lower contact portion of the first terminal through the lower and upper connecting surfaces of the connecting disc, and
the lower contact portion of the second terminal contacts the sensor body.

* * * * *

UNITED STATES PATENT AND TRADEMARK OFFICE
CERTIFICATE OF CORRECTION

| | | |
|---|---|---|
| PATENT NO. | : 8,029,188 B2 | |
| APPLICATION NO. | : 11/990206 | |
| DATED | : October 4, 2011 | |
| INVENTOR(S) | : Hee Wan Park | |

Figure 1:
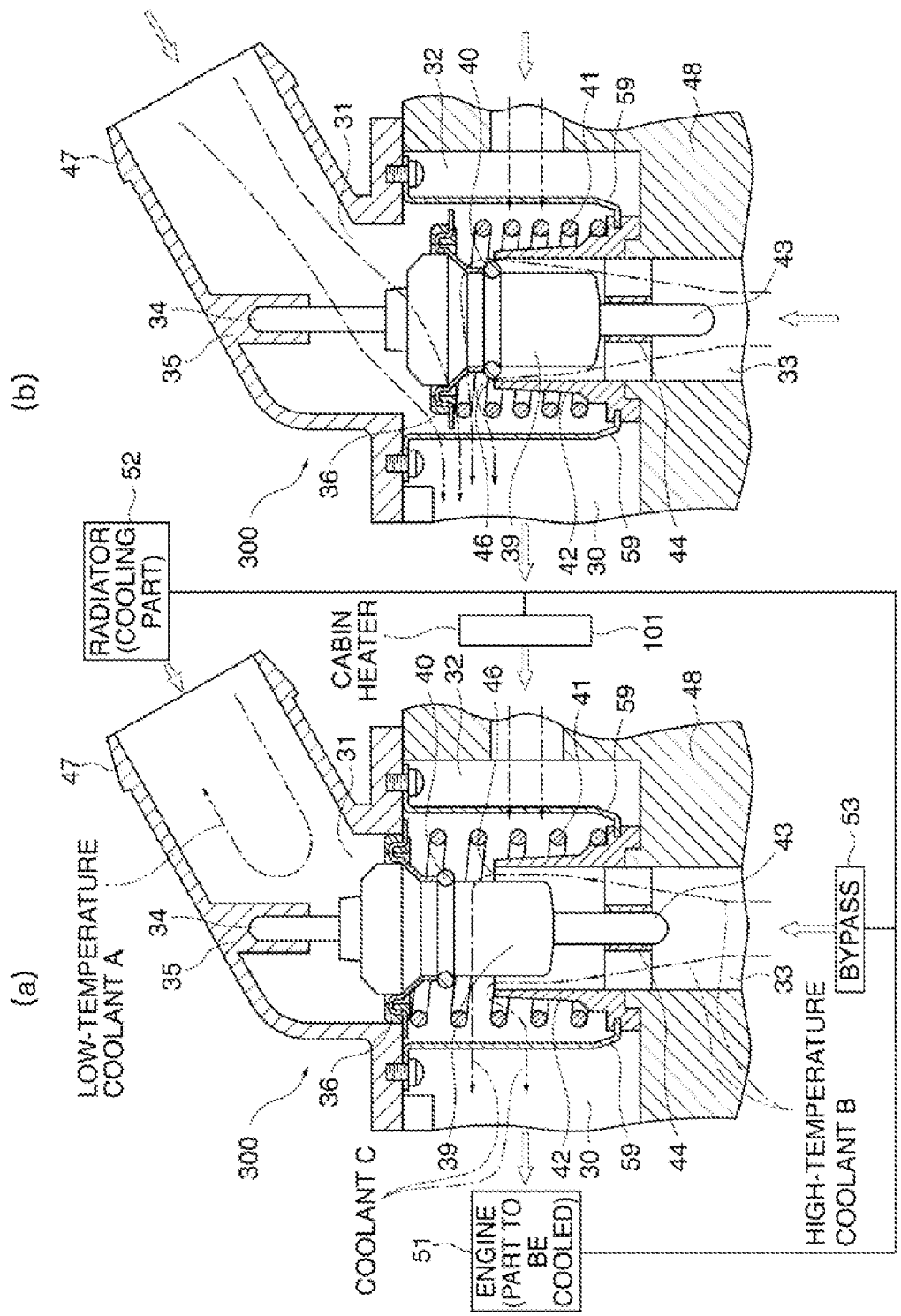
FIG. 1 is a cross-sectional view showing a conventional temperature sensor for an automobile.
Figure 2:
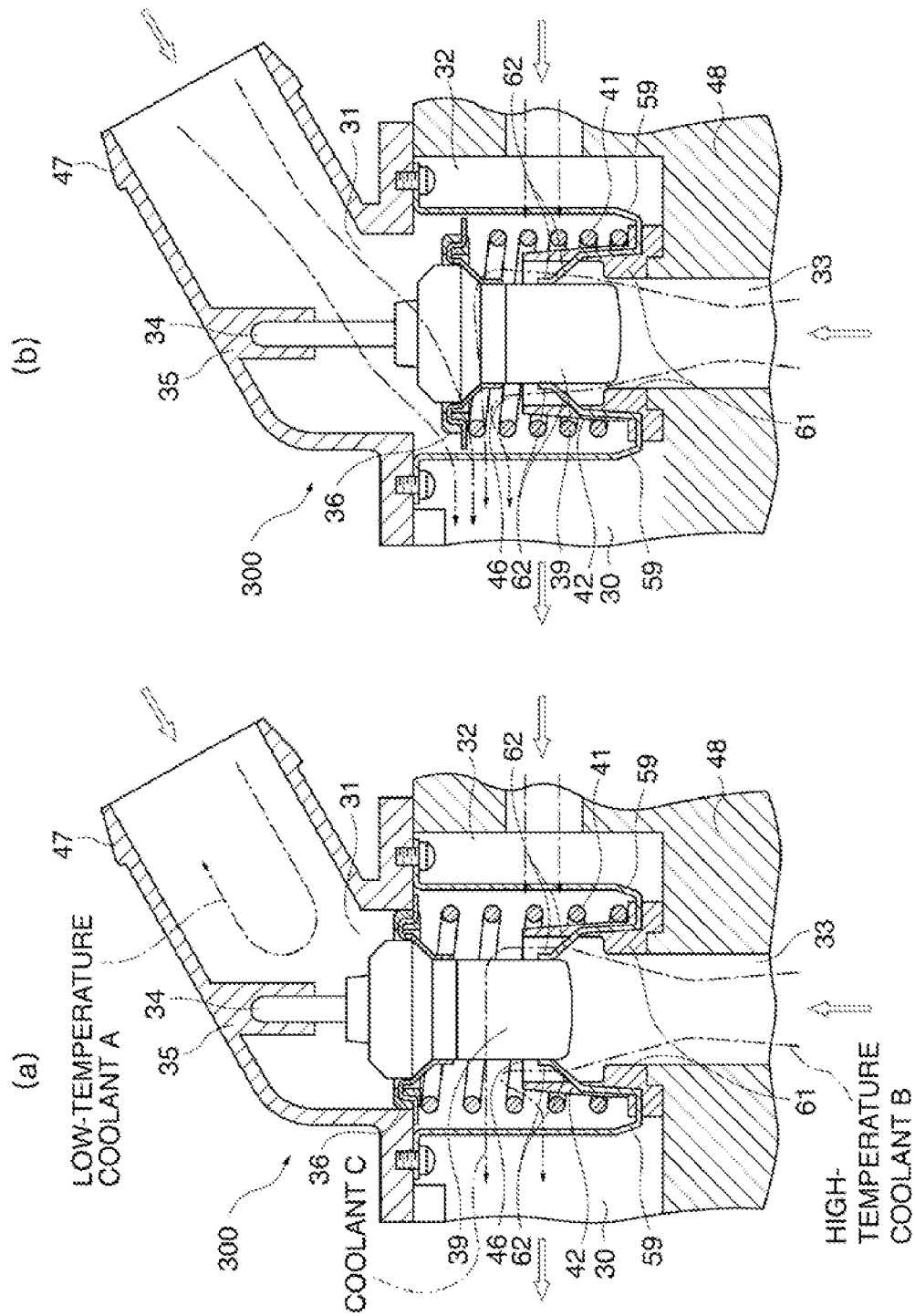
FIG. 2 is an enlarged view of circle "A" in FIG. 1.

It is certified that error appears in the above-identified patent and that said Letters Patent is hereby corrected as shown below:

The sheet of drawing consisting of Figures 1-2 should be deleted to appear as per attached Figures 1-2.

Signed and Sealed this
Twenty-eighth Day of August, 2012

David J. Kappos
*Director of the United States Patent and Trademark Office*